United States Patent [19]

Valdez et al.

[11] 4,167,477

[45] Sep. 11, 1979

[54] SEPARATION OF PLASTICS BY FLOTATION

[75] Inventors: Espiridion G. Valdez, Salt Lake City; Wayne J. Wilson, Orem, both of Utah

[73] Assignee: The United States of America as represented by the Secretary of the Interior, Washington, D.C.

[21] Appl. No.: 870,161

[22] Filed: Jan. 17, 1978

[51] Int. Cl.² ............................................. B03D 1/02
[52] U.S. Cl. .................................................... 209/166
[58] Field of Search ................... 209/164, 165, 166, 1, 209/3, 4, 9; 210/44

[56] References Cited

U.S. PATENT DOCUMENTS

| | | | |
|---|---|---|---|
| 1,195,264 | 8/1916 | Pennington | 209/166 |
| 3,160,586 | 12/1964 | Duke | 209/166 X |
| 3,224,582 | 12/1965 | Iannirelli | 209/166 |
| 3,284,282 | 11/1966 | Immel | 209/1 |
| 3,925,200 | 12/1975 | Izuni | 209/166 X |
| 4,046,677 | 9/1977 | Saitoh | 209/166 |

FOREIGN PATENT DOCUMENTS 1437884 6/1976 United Kingdom ...................... 210/44

*Primary Examiner*—Robert Halper
*Attorney, Agent, or Firm*—William S. Brown; Donald A. Gardiner

[57] ABSTRACT

Individual components of mixtures of plastic materials are separated by flotation employing sodium silicate as a wetting agent and fatty amines as promoters.

2 Claims, No Drawings

SEPARATION OF PLASTICS BY FLOTATION

Because of present and projected increases in the use of plastics in various articles of manufacture, particularly automobile components, methods for reclaiming plastic materials is assuming increasing importance in scrap processing. Various methods have previously been attempted for separation of mixtures of plastic materials. These include flotation processes as disclosed in U.S. Pat. Nos. 3,925,200; 3,926,790; 3,926,791 and 3,985,650, in which a variety of wetting and conditioning agents are employed.

Applicants have now found, according to the process of the invention, that a particularly effective separation of individual plastic materials from mixtures of such materials may be achieved by means of a flotation process employing sodium silicate as a wetting agent and fatty amines or salts thereof as cationic promoters. The process has been found to be particularly effective in separation of polystyrene from polyamide plastics employing sodium silicate as wetting agent, and subsequent separation of polyamide plastics using fatty amines as promoters.

Polystyrene plastics to which the process of the invention is applicable will include a wide variety of conventional materials of varying chemical and physical properties, such as molecular weights and specific gravities. Genrally, however, such materials will have molecular weights in the range of about 70 to 210 and specific gravities of about 0.899 to 1.090 gm/cc. The polyamide plastics are also conventional materials and consist of long-chain synthetic polyamides, typical of which are the nylon plastics. Again, chemical and physical properties of these plastics may vary considerably. However, materials having molecular weights in the range of about 100 to 200 and specific gravities of about 1.158 to 1.345 gm/cc are generally suitable for treatment according to the process of the invention.

The feed material, i.e., a mixture of polystyrene and polyamide plastics, is initially comminuted to a particle size suitable for utilization in a flotation process, a particle size in the range of about minus 4 plus 8 mesh generally being satisfactory. It is then admixed in a conventional flotation cell with an aqueous solution of sodium silicate, the amount of feed being sufficient to form an aqueous pulp of a consistency suitable for an efficient flotation operation. Suitable amounts of feed will generally be amounts sufficient to provide a weight ratio of feed-to-aqueous solution in the range of about 1:8 to 1:11.

Optimum concentration of the sodium silicate, which serves as a wetting agent, in the aqueous solution will depend on the specific plastics being separated. However, for separation of polystyrene plastics from nylon plastics, a concentration of about 0.1 to 1.0 g/l is generally satisfactory.

The above-mentioned concentration of sodium silicate provides a pH of about 9.0 to 9.3, at which the initial flotation separation of polystyrene plastic is carried out. Room temperature is usually satisfactory for the flotation separation, but temperatures of about 20° to 36° C. may be employed. The plastic feed is then conditioned in the aqueous sodium silicate, with stirring, for a period of about 8 to 12 minutes, after which the mixture is subjected to flotation.

The flotation procedure is conventional and consists of introduction of gas, preferably air, bubbles into the cell, whereby the polystyrene is selectively floated. Optimum flow rate of the air and time of aeration will vary with the specific composition and amount of the feed, type of flotation cell employed, etc. However, a flow rate of about 0.1 to 0.3 cubic feet of air per minute per gallon of pulp, for a period of about 3 to 5 minutes will generally be satisfactory. Subsequently or simultaneously, the resulting float product is separated by conventional means such as scrapers or paddles. This has been found to result in a primary float product consisting of essentially 100 percent polystyrene, with about 90 percent, or greater, of the polystyrene being thus recovered.

Tailings from the above primary flotation will consist of one or more polyamide plastics, as well as a small amount of residual polystyrene. It has also been found that separation of different polyamide plastics in the tailings can be accomplished by addition of a fatty amine as promoter, adjustment of pH and flotation to selectively float a particular polyamide material. Prefered fatty amines are primary fatty amines having molecular weights of about 325 to 365. These may be employed as such, or in the form of a salt such as the acetate. Addition of water may also be necessary to again form a pulp of a consistency suitable for flotation.

The optimum amount of the fatty amine will also depend on the specific polyamide plastics being separated. Generally, however, an amount of about one pound of fatty amine per ton of plastics gives good results. Adjustment of the pH to a value of about 4.5 to 5.0 is also desirable for maximum separation of the polyamide plastics. This may be achieved by addition of a suitable amount of an acid such as hydrochloric acid. Again, room temperature is satisfactory. The plastic materials are then conditioned in the aqueous pulp for a period of about 4 to 6 minutes, after which the mixture is subjected to conventional flotation, as described above, to selectively float a specific polyamide plastic material.

Although the invention has been described with reference to separation of polystyrene from polyamides and subsequent separation of the latter, the feed mixture may also contain other plastic materials such as those illustrated in the examples set forth below.

The invention will now be more specifically illustrated by the following examples.

EXAMPLE 1

A granulated (−4+8 mesh), 1.0 pound, sample consisting of equal amounts of polystyrene (m.w.=210), duPont nylon N-100 (long-chain polyamide of molecular weight of about 113) and Zytel nylon (long-chain polyamide of molecular weight of about 173) was added to a flotation cell containing 1.2 gallons of a 0.1 percent aqueous solution of sodium silicate. This concentration of sodium silicate resulted in a pH of the solution of 9.3.

The resulting pulp was conditioned for 5 minutes, following which air bubbles were introduced into the cell at a rate of 0.25 cubic feet per minute for a period of 5 minutes. The resulting primary float product consisted of 100 percent polystyrene and contained 92.5 percent of the polystyrene in the sample.

The tailings from the above flotation, containing the duPont nylon N-100 and Zytel nylon, was then subjected to a secondary flotation process to separate the two types of nylon. Water, Aeromine 3037 ($C_{17}$ primary amine acetate) and hydrochloric acid were added in amounts sufficient to form a pulp containing 9.1 percent plastic material, 0.02 percent Aeromine 3037 having a pH of 5.0. The secondary flotation procedure was essentially the same as that of the above primary flotation, and resulted in a secondary float product consisting of 91.7 percent duPont nylon N-100 and containing 99.0 percent of the duPont nylon N-100. Tailings from the secondary flotation contained 98.5 percent of the Zytel nylon as a 99 percent product.

EXAMPLE 2

The procedure in this example was similar to that of Example 1, except that the feed consisted of a mixture of equal amounts of polystyrene, Zytel nylon and an acrylonitrile-butadiene-styrene copolymer (ABS). The primary float consisted of 97 percent polystyrene, with 96 percent of the polystyrene being recovered.

The secondary flotation was conducted at a pH of 4.5 and resulted in recovery of 96.6 percent of the ABS as a float product consisting of 86.5 percent ABS. Tailings from the secondary floatation contained 89 percent of the Zytel nylon as a 99.4 percent product.

EXAMPLE 3

The procedure in this example was similar to that of Example 1, except that the feed consisted of a mixture of equal amounts of polystyrene, Zytel nylon and acrylics. The primary float consisted of 93.8 percent polystyrene, with 98 percent of the polystyrene being recovered.

The secondary flotation was conducted at a pH of 4.8 and resulted in recovery of 61 percent of the acrylics as a float product consisting of 96.8 percent acrylics. Tailings from the secondary flotation contained 100 percent of the Zytel nylon as a 75.5 percent product.

We claim:

1. A process for separation of polystyrene plastic from polyamide plastics comprising conditioning a mixture of the plastic materials in an aqueous solution of sodium silicate at a pH of about 9 to 9.3 and subjecting the resulting mixture to froth flotation, whereby the polystyrene plastics is floated and the polyamide plastic remain in the tailings.

2. The process of claim 1, comprising the additional step of conditioning the tailings in an aqueous solution of a primary fatty amine, or salt thereof, at a pH of about 4.5 to 5.0, and subjecting the resulting mixture to froth flotation to separate individual polyamide plastics.

* * * * *